United States Patent
Kodama et al.

(10) Patent No.: US 8,711,516 B2
(45) Date of Patent: Apr. 29, 2014

(54) ROTATING DEVICE

(71) Applicant: Samsung Electro-Mechanics Japan Advanced Technology Co., Ltd., Fujieda (JP)

(72) Inventors: Mitsuo Kodama, Fujieda (JP); Masafumi Mizuno, Yaizu (JP); Taketo Nonaka, Fujieda (JP)

(73) Assignee: Samsung Electro-Mechanics Japan Advanced Technology, Co., Ltd., Fujieda (JP)

( * ) Notice: Subject to any disclaimer, the term of this patent is extended or adjusted under 35 U.S.C. 154(b) by 0 days.

(21) Appl. No.: 13/954,889

(22) Filed: Jul. 30, 2013

(65) Prior Publication Data

US 2014/0036391 A1 Feb. 6, 2014

(30) Foreign Application Priority Data

Aug. 1, 2012 (JP) ................... 2012-170836

(51) Int. Cl.
*G11B 19/20* (2006.01)

(52) U.S. Cl.
USPC ....................................... 360/99.08

(58) Field of Classification Search
USPC .......... 360/99.08, 99.16, 97.12, 97.17, 97.22; 720/721; 361/89, 90
See application file for complete search history.

(56) References Cited

U.S. PATENT DOCUMENTS

| | | | |
|---|---|---|---|
| 5,533,811 A | 7/1996 | Polch et al. | |
| 7,675,210 B2 * | 3/2010 | Maekawa et al. | 310/90 |
| 7,982,349 B2 | 7/2011 | Popov et al. | |
| 8,064,166 B2 | 11/2011 | Kainoh et al. | |
| 8,107,195 B2 | 1/2012 | Sugiki | |
| 8,277,125 B2 | 10/2012 | Kimura et al. | |
| 8,337,086 B2 | 12/2012 | Oe et al. | |
| 2009/0276996 A1 * | 11/2009 | Maekawa et al. | 29/596 |
| 2013/0235489 A1 * | 9/2013 | Aoshima | 360/99.08 |
| 2013/0279043 A1 * | 10/2013 | Kodama et al. | 360/97.19 |

FOREIGN PATENT DOCUMENTS

| | | |
|---|---|---|
| JP | 2009-162246 A | 7/2009 |
| JP | 2010-127448 A | 6/2010 |

* cited by examiner

*Primary Examiner* — Allen T Cao
(74) *Attorney, Agent, or Firm* — Holtz, Holtz, Goodman and Chick, PC

(57) ABSTRACT

A rotating device includes a sleeve which encircles a shaft, a housing which supports the shaft and which forms an annular supporting recess where the lower end of the sleeve enters together with the shaft, a ring member which is provided above the sleeve and which is fixed to the shaft in a manner encircling the shaft. A first gap between the sleeve and the shaft includes first and second radial dynamic pressure generating portions. An annular sleeve recess is formed in upper face of the sleeve. The ring member includes a ring entering portion that enters the sleeve recess in a non-contact manner. An outward gap in the radial direction where the ring entering portion and the sleeve recess face with each other in the radial direction includes a second air-liquid interface of a lubricant.

20 Claims, 6 Drawing Sheets

ROTATING DEVICE

BACKGROUND OF THE INVENTION

1. Field of the Invention

The present invention relates to a fastened-shaft type rotating device.

2. Description of the Related Art

Disk drive devices like hard disk drives are becoming compact and increasing the capacity, and loaded in various electronic devices. In particular, loading of such disk drive devices in portable electronic devices, such as a laptop computer and a portable music player, is advancing. Disk drive devices loaded in such portable electronic devices need improvement of the shock-resistant performance and the vibration-resistance performance so as to withstand against a shock due to falling and a vibration during a carriage in comparison with ones loaded in stationary electronic devices like a desktop personal computer.

For example, JP 2009-162246 A and JP 2010-127448 A disclose motors which have a shaft fastened to a base plate and which employ a fluid dynamic bearing as a bearing mechanism.

SUMMARY OF THE INVENTION

Conventional fastened-shaft type disk drive devices disclosed in JP 2009-162246 A and JP 2010-127448 A have a radial dynamic pressure generating portion and a tapered seal provided in series along the shaft. In order to increase the rigidity of a radial bearing in such a structure, a radial span may be elongated, but in this case, it is necessary to make the whole disk drive device thickened by what corresponds to the elongation or to make the tapered seal thinned by what corresponds to such an elongation. The former case is an inversed approach to the current trends for thinning of the disk drive devices, and thus the former case is not suitable. The latter case brings about a technical disadvantage such that the amount of held lubricant decreases, and the sealing function becomes weak, and thus the lubricant becomes likely to fly off.

Such technical disadvantages may occur in the case of not only disk drive devices but also other kinds of rotating devices, in particular, rotating devices having a shaft included in a fixed body and employing a fluid dynamic bearing mechanism.

The present invention has been made in view of the above-explained circumstances, and it is an object of the present invention to provide a rotating device that can advance a thinning while maintaining or improving the rigidity of a bearing unit.

To accomplish the above object, a first aspect of the present invention provides a rotating device that includes: a first encircling member which encircles a shaft and which is rotatable relative to the shaft; a shaft supporting member which supports the shaft and which forms an annular first recess where one end of the first encircling member enters together with the shaft; a second encircling member which is provided at another-end side of the first encircling member and which is fixed to the shaft in a manner encircling the shaft; and a lubricant present in respective gaps between the first encircling member and the shaft, the first encircling member and the shaft supporting member, and, the first encircling member and the second encircling member, in which: the gap between the first encircling member and the shaft includes a radial dynamic pressure generating portion that produces dynamic pressure in the lubricant in a radial direction when the first encircling member rotates relative to the shaft; an annular second recess concaved in an axial direction is formed in an another-end face of the first encircling member; the second encircling member comprises an entering portion that enters the second recess in a non-contact manner; and an outward gap in the radial direction between two gaps where the entering portion and the second recess face with each other in the radial direction includes an air-liquid interface of the lubricant.

To accomplish the above object, a second aspect of the present invention provides a rotating device that includes: a first encircling member which encircles a shaft and which is rotatable relative to the shaft; a shaft supporting member which supports the shaft and which forms an annular first recess where one end of the first encircling member enters together with the shaft; a second encircling member which is provided at another-end side of the first encircling member and which is fixed to the shaft in a manner encircling the shaft; and a lubricant present in respective gaps between the first encircling member and the shaft, the first encircling member and the shaft supporting member, and, the first encircling member and the second encircling member, in which: the gap between the first encircling member and the shaft includes a radial dynamic pressure generating portion that produces dynamic pressure in the lubricant in a radial direction when the first encircling member rotates relative to the shaft; an annular second recess concaved in an axial direction is formed in an another-end face of the first encircling member; the second encircling member comprises an entering portion that enters the second recess in a non-contact manner; a supporting hole is formed in the shaft along the axial direction; and the shaft supporting member comprises a supporting protrusion which is inserted in the supporting hole and which is fixed thereto.

To accomplish the above object, a third aspect of the present invention provides a rotating device that includes: a first encircling member which encircles a shaft and which is rotatable relative to the shaft; a shaft supporting member which supports the shaft and which forms an annular first recess where one end of the first encircling member enters together with the shaft; a second encircling member which is provided at another-end side of the first encircling member and which is fixed to the shaft in a manner encircling the shaft; and a lubricant present in respective gaps between the first encircling member and the shaft, the first encircling member and the shaft supporting member, and, the first encircling member and the second encircling member, in which: the gap between the first encircling member and the shaft includes a radial dynamic pressure generating portion that produces dynamic pressure in the lubricant in a radial direction when the first encircling member rotates relative to the shaft; an annular second recess concaved in an axial direction is formed in an another-end face of the first encircling member; the second encircling member comprises an entering portion that enters the second recess in a non-contact manner; the rotating device further comprises a hub which is fixed to an outer circumference of the first encircling member and on which a recording disk is to be mounted, in which: the hub includes: a hub protrusion to be engaged with a center hole of the recording disk; and a mount portion provided outwardly in the radial direction with respect to the hub protrusion; and the recording disk is fastened to the hub by being held between a clamper engaged with an outer circumference of the hub protrusion and the mount portion.

Any arbitral combination of the above-explained structural components and mutual replacement of the structural components and expressions of the present invention between a method, a device, and a system, etc., are also within the scope and spirit of the present invention.

According to the present invention, it becomes possible to accomplish a thinning of a rotating device while maintaining or improving the bearing rigidity of the rotating device.

DETAILED DESCRIPTION OF THE PREFERRED EMBODIMENTS

Figure 1A:
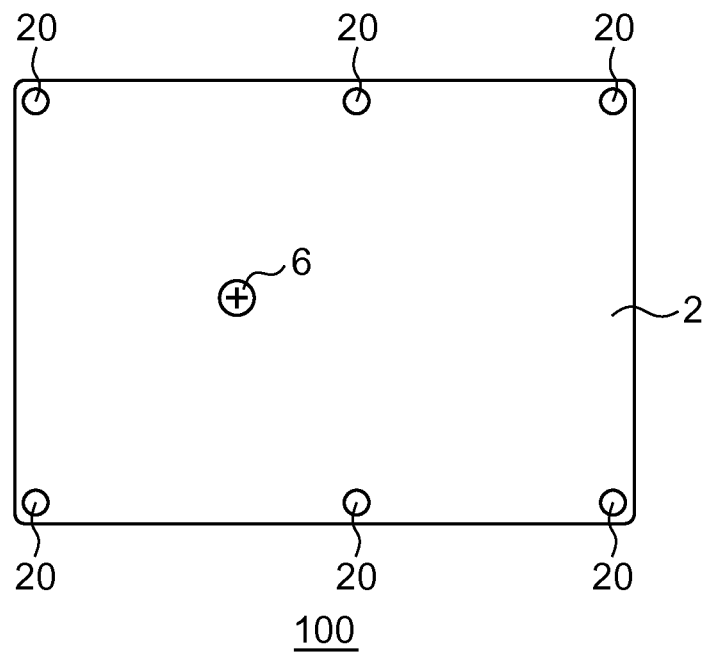
FIGS. 1A to 1C are diagrams illustrating a rotating device according to an embodiment of the present invention.

In the following explanation, the same or corresponding component and member in respective figures are denoted by the same reference numeral, and the duplicated explanation thereof will be omitted accordingly. Moreover, the dimension of the member in each figure is enlarged or reduced as needed in order to facilitate understanding to the present invention. A portion of the member not important to explain an embodiment of the present invention in each figure is illustrated in an omitted manner.

A rotating device according to an embodiment of the present invention is suitably utilized as a disk drive device like a hard disk drive on which a magnetic recording disk is to be loaded and which rotates such a magnetic recording disk, in particular, a fastened-shaft type disk drive device which has a shaft fastened to a base and has a hub rotatable with respect to the fastened shaft.

According to the rotating device of this embodiment, a tapered seal including an air-liquid interface of a lubricant is provided outwardly in the radial direction of a radial dynamic pressure generating portion. Hence, the tapered seal and the radial dynamic pressure generating portion can be elongated in the axial direction, i.e., the direction parallel to a rotation axis substantially independent from each other, and thus the leak-out of the lubricant can be reduced by the elongation of the tapered seal, while at the same time, the rigidity of a bearing is enhanced.

Figure 1B:
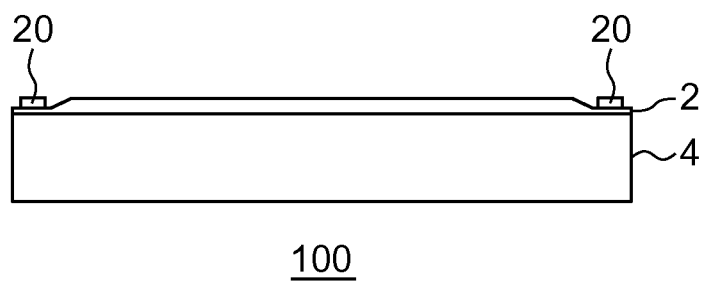
Figure 1C:
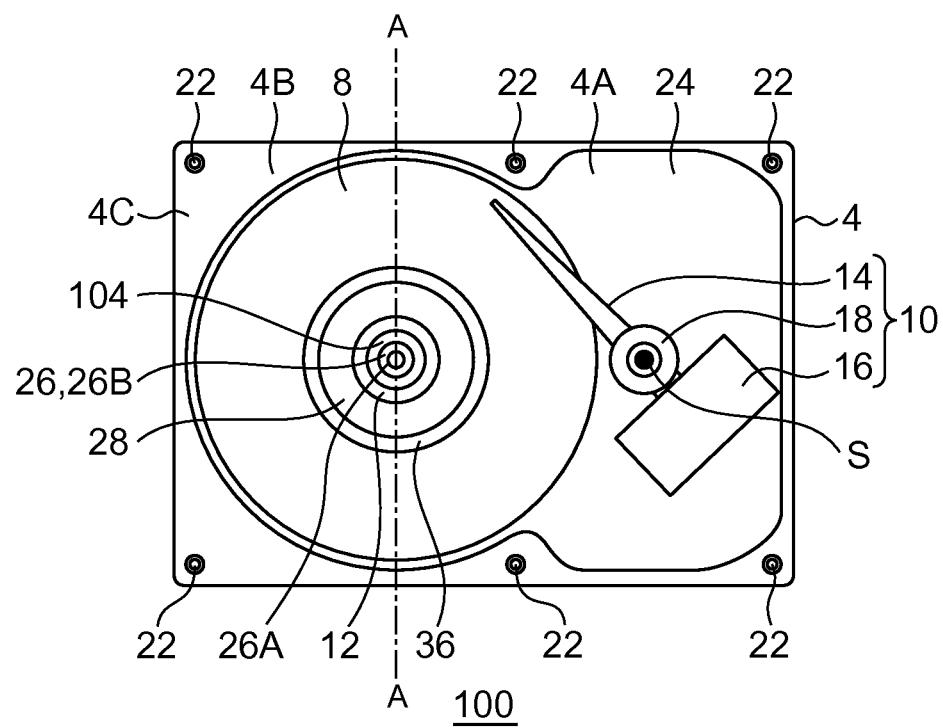

FIGS. 1A to 1C are diagrams illustrating a rotating device 100 of this embodiment. FIG. 1A is a top view of the rotating device 100. FIG. 1B is a side view of the rotating device 100. FIG. 1C is a top view of the rotating device 100 with a top cover 2 being detached therefrom. The rotating device 100 includes a fixed body, a rotating body that rotates relative to the fixed body, a magnetic recording disk 8 to be attached to the rotating body, and a data reader/writer 10. The fixed body includes a base 4, a shaft 26 fastened to the base 4, the top cover 2, for example, six screws 20, and a shaft fastening screw 6. The rotating body includes a hub 28 and a clamper 36.

In the following explanation, a side where the hub 28 is mounted relative to the base 4 is defined as an upper side.

The magnetic recording disk 8 is, for example, a 2.5-inch magnetic recording disk formed of glass and having a diameter of 65 mm. The magnetic recording disk 8 has a center hole with a diameter of, for example, 20 mm, and has a thickness of, for example, 0.65 mm. The hub 28 carries, for example, one magnetic recording disk 8.

The base 4 is formed by performing die-cast molding on an aluminum alloy. The base 4 includes a bottom plate 4A that forms the bottom of the rotating device 100, and an outer circumferential wall 4B formed along the outer circumference of the bottom plate 4A so as to surround an area where the magnetic recording disk 8 is to be mounted. The outer circumferential wall 4B has, for example, six screw holes 22 provided in a top face 4C thereof.

The data reader/writer 10 includes a recording/playing head (unillustrated), a swing arm 14, a voice coil motor 16, and a pivot assembly 18. The recording/playing head is attached to the tip of the swing arm 14, records data in the magnetic recording disk 8, or reads the data therefrom. The pivot assembly 18 supports the swing arm 14 in a swingable manner to the base 4 around a head rotating shaft S. The voice coil motor 16 allows the swing arm 14 to swing around the head rotating shaft S to move the recording/playing head to a desired location over the top face of the magnetic recording disk 8. The voice coil motor 16 and the pivot assembly 18 are configured by conventionally well-known technologies of controlling the position of a head.

The top cover 2 is fastened to the top face 4C of the outer circumferential wall 4B of the base 4 by, for example, the six screws 20. The six screws 20 correspond to the six screw holes 22, respectively. In particular, the top cover 2 and the top face 4C of the outer circumferential wall 4B are fastened with each other so as to suppress a leak into the interior of the rotating device 100 from the joined portion of the top cover 2 and the top face 4C. The interior of the rotating device 100 is, more specifically, a clean space 24 surrounded by the bottom plate 4A of the base 4, the outer circumferential wall 4B of the base 4, and the top cover 2. This clean space 24 is designed so as to be fully sealed, i.e., so as not to have a leak-in from the exterior or a leak-out to the exterior. The clean space 24 is filled with clean air having particles eliminated. Hence, foreign materials like the particles are prevented from sticking to the magnetic recording disk 8, thereby improving the reliability of the operation of the rotating device 100.

The shaft 26 runs in the axial direction. A shaft-fastening-screw hole 26A is provided in an upper end face 26B of the shaft 26. The shaft 26 has the lower end fastened to the base 4 in a manner to be discussed later. The shaft fastening screw 6 passes through the top cover 2 and is engaged with the shaft-fastening-screw hole 26A, thereby fastening the upper end of the shaft 26 to the top cover 2 and the base 4.

The shaft 26 is formed of a ferrous material like SUS 420 J2 having undergone quenching. By performing quenching on the shaft 26, in particular, the hardness of the shaft-fastening-screw hole 26A can be higher than the hardness of the shaft fastening screw 6 engaged with such a hole. This reduces a possibility that the shaft fastening screw 6 strips the thread.

According to a rotating device of a type having both ends of the shaft 26 fastened to a chassis like the base 4 and the top cover 2 in this manner among fastened-shaft type rotating devices, a shock-resistant performance and a vibration-resistance performance of the rotating device can be improved. According to the rotating device of this type, when a fluid dynamic bearing unit is applied thereto, in general, there are two air-liquid interfaces of a lubricant.

Figure 2:
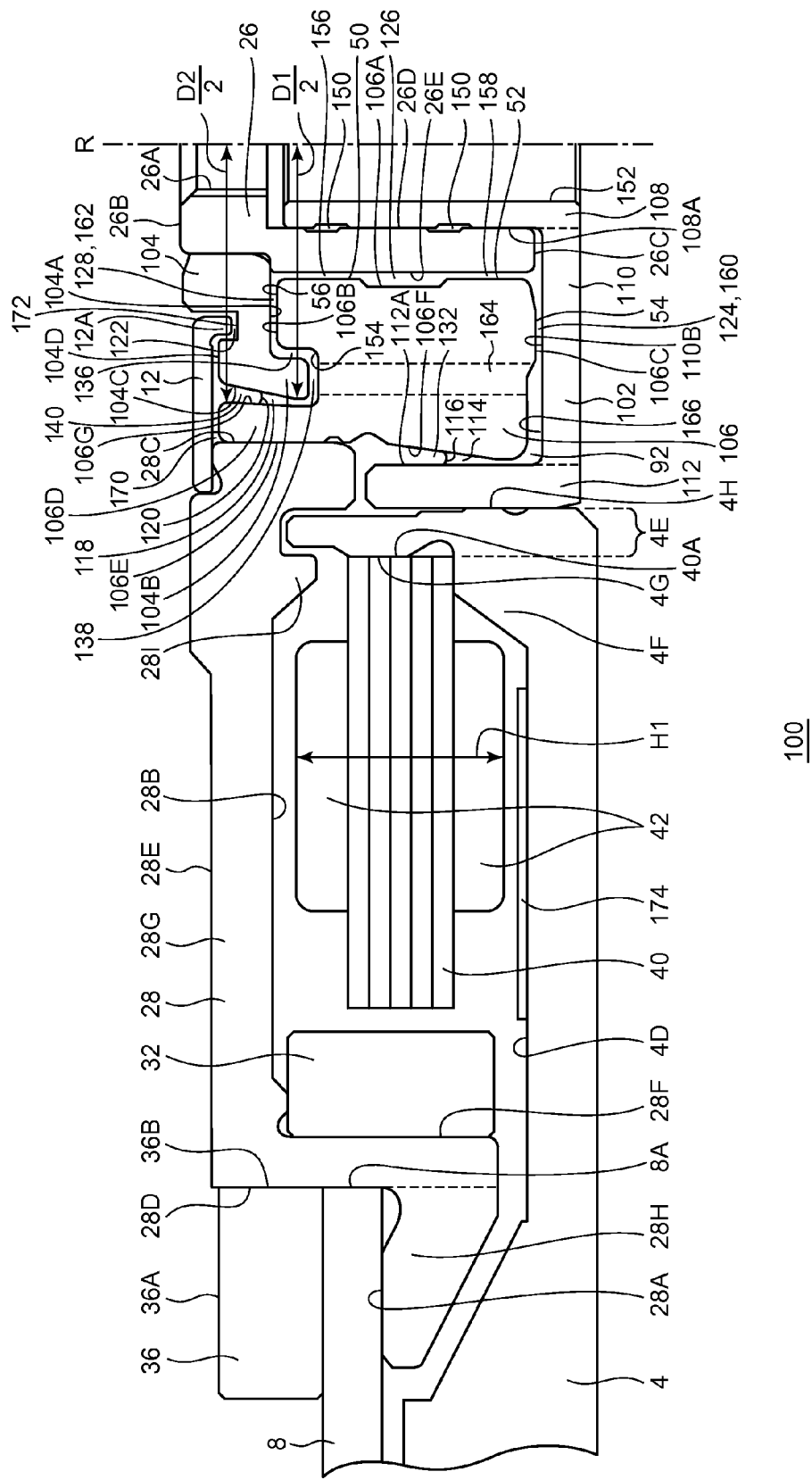
FIG. 2 is a cross-sectional view taken along a line A-A in FIG. 1C.

FIG. 2 is a cross-sectional view taken along a line A-A in FIG. 1C.

The rotating body includes the hub 28, the clamper 36, a cylindrical magnet 32, a sleeve 106, and a cover ring 12. The fixed body includes the base 4, a stacked core 40, a coil 42, a housing 102, the shaft 26, and a ring member 104. A lubricant 92 is continuously present in some spaces between the rotating body and the fixed body.

When the rotating device 100 is manufactured, a fluid dynamic bearing unit including the housing 102, the sleeve 106, the ring member 104, the lubricant 92, and the shaft 26 is manufactured at first. Next, the hub 28, the base 4, and the cover ring 12, etc., are attached to the fluid dynamic bearing unit to assemble the rotating device 100. The base 4 supports the hub 28 in a freely rotatable manner through this fluid dynamic bearing unit.

The hub 28 is formed by cutting and machining or pressing a ferrous material like SUS 430 with a soft magnetism, and is formed in a predetermined shape like a substantially cup shape. An example ferrous material preferable for the hub 28 is stainless steel with a product name DHS1 supplied by DAIDO Steel Co., Ltd, which has little outgas and easiness for processing. Likewise, stainless steel with a product name DHS2 supplied by the same manufacturer is more preferable from the standpoint of better corrosion resistance. A surface treatment like plating or resin coating may be applied to the hub 28. The hub 28 of this embodiment has a skin layer that is an electroless nickel plating. This suppresses a peeling of minute residues sticking to the processed surface.

The hub 28 includes a hub protrusion 28G to be fitted in a center hole 8A of the magnetic recording disk 8, and a mount portion 28H provided outwardly in the radial direction of the hub protrusion 28G. The hub protrusion 28G is provided with a sleeve hole 28C around a rotation axis R. The magnetic recording disk 8 is to be mounted on a disk mount face 28A that is the top face of the mount portion 28H. The magnetic recording disk 8 is held between the clamper 36 and the mount portion 28H, thereby being fastened to the hub 28.

The clamper 36 applies downward force to the upper face of the magnetic recording disk 8, thereby causing the magnetic recording disk 8 to contact the disk mount face 28A with pressure. The clamper 36 is engaged with an outer periphery 28D of the hub protrusion 28G. The clamper 36 and the outer periphery 28D of the hub protrusion 28G may be joined together by a mechanical joining technique, such as thread engagement, caulking, or press-fitting, or a magnetic joining technique utilizing magnetic suction force.

The clamper 36 is formed in such a way that an upper face 36A of the clamper 36 does not go over an upper face 28E of the hub protrusion 28G and not protrude upwardly therefrom in the axial direction with the clamper 36 applying desired downward force to the magnetic recording disk 8.

When, for example, the clamper 36 and the outer periphery 28D of the hub protrusion 28G are threadably engaged with each other, a male screw thread is formed on the outer periphery 28D of the hub protrusion 28G and a corresponding female screw thread is formed on an inner periphery 36B of the clamper 36. In this case, the tension of downward force applied by the clamper 36 to the upper face of the magnetic recording disk 8 can be relatively precisely controlled by the strength of such thread engagement. The clamper 36 may be formed of multiple pieces, or may be a single piece.

The cylindrical magnet 32 is bonded and fastened to a cylindrical inner periphery 28F that is an internal cylindrical face of the hub 28 in a substantially cup shape. The cylindrical magnet 32 is formed of, for example, a rare-earth magnetic material or a ferrite magnetic material. In this embodiment, the cylindrical magnet 32 is formed of a neodymium-based rare-earth magnetic material. Magnetization of 12 poles for driving is performed on the cylindrical magnet 32 in the circumferential direction (a tangent line direction of a circle around the rotation axis R and perpendicular to the rotation axis R). A skin layer forming process like an electrodeposition coating or a spray painting is performed on the surface of the cylindrical magnet 32 in order to suppress, for example, a corrosion. The cylindrical magnet 32 faces nine salient poles of the stacked core 40 in the radial direction (i.e., the direction orthogonal to the rotation axis R).

Figure 3:
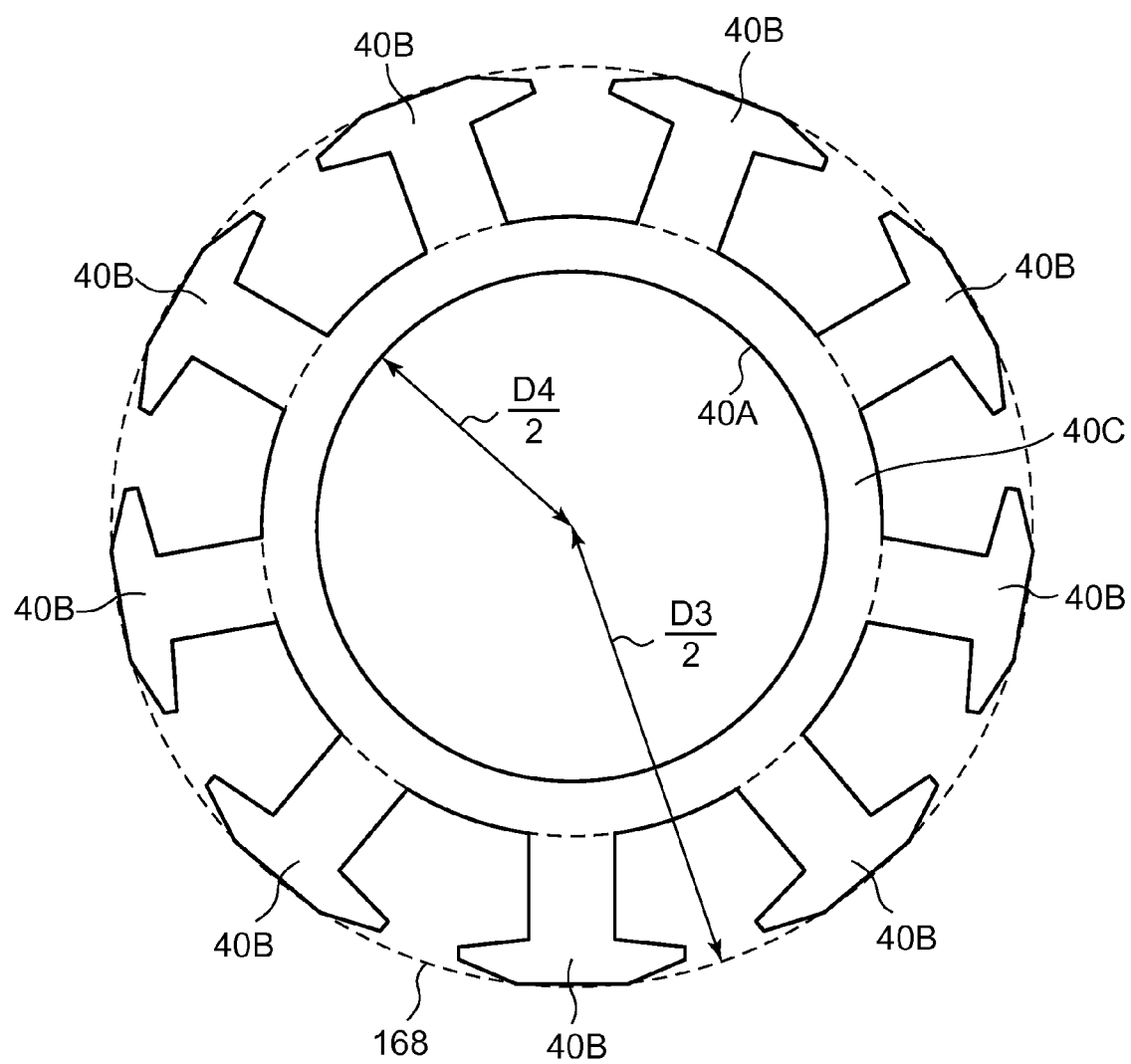
FIG. 3 is a top view of a stacked core in FIG. 2.

FIG. 3 is a top view of the stacked core 40. The stacked core 40 includes an annular part 40C and for example, nine salient poles 40B protruding from the annular part 40C outwardly in the radial direction. The stacked core 40 is fastened to the base 4 at an upper-face-4D side. The stacked core 40 is formed of, for example, five thin magnetic steel sheets stacked and integrated together by caulking. An insulation coating like an electrodeposition coating or a powder coating is applied to the surface of the stacked core 40. A coil 42 is wound around each salient pole 40B of the stacked core 40. When three-phase drive currents of substantially sinusoidal waves are caused to flow through the coils 42, drive magnetic fluxes are produced along the salient poles.

The stacked core 40 and the coils 42 are formed in such a way that a ratio of a height H1 of the coil 42 (see FIG. 2) relative to a difference (D3−D4) between the maximum outer diameter of the stacked core 40, i.e., a diameter D3 of a circle 168 inwardly contacting the nine salient poles 40B, and the minimum internal diameter of the stacked core 40, i.e., an internal diameter D4 of the annular part 40C is within a range from 0.2 to 0.3. As an example, the height H1 of the coil 42 is 2.22 mm, the difference (D3−D4) is 8.67 mm, and the ratio (H1/(D3−D4)) is 0.256. By forming the salient poles 40B relatively long, the height H1 of the coil 42 can be reduced, contributing the thinning of the rotating device 100.

Returning to FIG. 2, the base 4 includes a cylindrical base protrusion 4E around the rotation axis R of the rotating body. The base protrusion 4E protrudes toward the hub 28 so as to surround the housing 102. A center hole 40A of the annular part 40C of the stacked core 40 is engaged with an outer circumference 4G of the protrusion 4E, and thus the stacked core 40 is fastened to the base 4. In particular, the annular part 40C of the stacked core 40 is subjected to press-fitting or loose fitting to the protrusion 4E, and bonded and fastened.

The base 4 includes a shoulder portion 4F formed outwardly of the base protrusion 4E in the radial direction. The shoulder portion 4F is formed in a corresponding shape to the outer diameter of the coil 42. In the upper face 4D of the base 4, the corresponding portion to the salient poles 40B and the coil 42 is provided with an insulation sheet or tape 174 formed of a resin like PET.

The housing 102 includes a flat and annular housing bottom 110, a cylindrical base-side encircling member 112 fixed to the outer circumference of the housing bottom 110, and a cylindrical supporting protrusion 108 fastened to the inner circumference of the housing bottom 110. The housing 102 supports the shaft 26. The housing 102 forms an annular recess 166 into which the bottom end of the sleeve 106 together with the shaft 26 enters.

The housing bottom 110 and the base-side encircling member 112 are joined together in such a way that the whole outer circumference of the housing bottom 110 contacts the lower part of an inner circumference 112A of the base-side encircling member 112, and in particular, the housing bottom 110 and the base-side encircling member 112 are integrally formed together. The housing bottom 110 and the supporting protrusion 108 are joined together in such a way that the whole inner circumference of the housing bottom 110 contacts the lower part of an outer circumference 108A of the supporting protrusion 108, and in particular, the housing bottom 110 and the supporting protrusion 108 are integrally formed together. In this case, the manufacturing error in the housing 102 can be reduced, and a joining work can be eliminated.

The base-side encircling member 112 is surrounded by the protrusion 4E. In particular, the base-side encircling member 112 is fitted in a bearing hole 4H provided in the base 4 around the rotation axis R, and bonded and fastened thereto.

A supporting hole 26D is formed in a lower end face 26C of the shaft 26 along the axial direction. The shaft-fastening-screw hole 26A is in communication with the supporting hole 26D. That is, the shaft 26 is in a hollow shape. The supporting protrusion 108 is fitted in and fastened to the supporting hole 26D. The supporting protrusion 108 is fastened to the supporting hole 26D by a combination of press-fitting and bonding. In particular, a joined portion between the outer circumference 108A of the supporting protrusion 108 and the circumference of the supporting hole 26D includes two adhesive retainers 150 distant from each other in the axial direction. Each adhesive retainer 150 retains thereinside an adhesive. In the joined portion other than the adhesive retainers 150, basically, the outer circumference 108A of the supporting protrusion 108 and the circumference of the supporting hole 26D are press-fitted.

When the supporting protrusion 108 is fitted in and fastened to the supporting hole 26D of the shaft 26, the shaft 26 and the supporting protrusion 108 are temporally assembled together by an action of the press-fitted portion until the adhesive retained in the adhesive retainers 150 is cured. While such a temporal assembling, the adhesive retained in the adhesive retainers 150 is cured, and thus a necessary fastening strength can be accomplished. In this case, in comparison with, for example, a case in which a necessary fastening strength is obtained by a total press-fitting, the squareness of the shaft 26 can be improved.

The supporting protrusion 108 is formed so as to have an equivalent linear expansion coefficient to that of the shaft 26. In particular, the housing 102 is formed of a material having substantially same linear expansion coefficient as that of the material of the shaft 26, e.g., SUS 430 or DHS 1. Accordingly, a negative effect to the squareness of the shaft 26 due to a temperature change can be reduced.

A through-hole 152 is formed in the supporting protrusion 108 along the rotation axis R. Alternatively, it is fine if the supporting protrusion 108 has no through-hole 152, or the supporting protrusion 108 may have a screw hole engaged with the shaft fastening screw 6 instead of the through-hole 152.

The ring member 104 is fastened to the shaft 26 so as to encircle the upper end side of the shaft 26. The ring member 104 is formed of, for example, SUS 430. The ring member 104 is fastened to the shaft 26 by a combination of press-fitting and bonding. When a total fastening strength is 30 (kg), 10 (kg) or so is a fastening strength obtained by bonding. The adhesive between the ring member 104 and the shaft 26 also serves as a sealant which seals a space between the ring member 104 and the shaft 26 and which prevents the lubricant 92 from leaking.

The sleeve 106 encircles a middle portion of the shaft 26 joined with the supporting protrusion 108. The lubricant 92 is present in the middle portion between the sleeve 106 and the shaft 26. That is, an inner circumference 106A of the sleeve 106 and an outer periphery 26E of the middle portion of the shaft 26 face with each other via a first gap 126, and the first gap 126 is filled with the lubricant 92.

The sleeve 106 is held between the ring member 104 and the housing 102 in the axial direction. The lubricant 92 is present in a space between the sleeve 106 and the ring member 104, and a space between the sleeve 106 and the housing 102. That is, an upper face 106B of the sleeve 106 and a lower face 104A of the ring member 104 face with each other via a second gap 128, and the second gap 128 is filled with the lubricant 92. A lower face 106C of the sleeve 106 and an upper face 110B of the housing bottom 110 face with each other via a third gap 124, and the third gap 124 is filled with the lubricant 92.

The hub 28 is fastened to an outer circumference 106E of an upper part 106D of the sleeve 106 by a combination of press-fitting and bonding. With respect to a positional relationship between the base-side encircling member 112 and the sleeve 106, the base-side encircling member 112 encircles the lower part of the sleeve 106.

A first tapered seal 114 where a fourth gap 132 between an inner circumference 112A of the base-side encircling member 112 and a lower outer circumference 106F of the sleeve 106 gradually becomes widespread toward the upper space is formed between the base-side encircling member 112 and the sleeve 106. In particular, the inner circumference 112A of the base-side encircling member 112 is formed so as to be substantially parallel to the rotation axis R, while the lower outer circumference 106F of the sleeve 106 is formed so as to reduce the outer diameter toward the upper space. Accordingly, the tapered shape of the first tapered seal 114 can be accomplished. The first tapered seal 114 includes a first air-liquid interface 116 of the lubricant 92, which suppresses a leak-out of the lubricant 92 by a capillary phenomenon. That is, the lubricant 92 is present at least partially between the base-side encircling member 112 and the sleeve 106. The first air-liquid interface 116 of the lubricant 92 contacts both inner circumference 112A of the base-side encircling member 112 and lower outer circumference 106F of the sleeve 106.

An annular sleeve recess 154 is formed in the upper face 106B of the sleeve 106 around the rotation axis R. The sleeve recess 154 is concaved downwardly. The ring member 104 includes a ring entering portion 104B that enters the sleeve recess 154. The ring entering portion 104B that enters the sleeve recess 154 forms a space in the sleeve recess 154 where the ring entering portion 104B and the sleeve recess 154 face with each other. In particular, this space includes a seventh gap 136 and a ninth gap 140 where the ring entering portion 104B and the sleeve recess 154 face with each other in the radial direction, and an eighth gap 138 where the ring entering portion 104B and the sleeve recess 154 face with each other in the axial direction. The ninth gap 140 is located outwardly of the seventh gap 136 in the radial direction.

The upper portion 106D of the sleeve 106 encircles the ring entering portion 104B. A second tapered seal 118 where the ninth gap 140 between the upper portion 106D of the sleeve 106 and the ring entering portion 104B gradually becomes widespread toward the upper space is formed between the upper portion 106D of the sleeve 106 and the ring entering portion 104B. In particular, both inner circumference 106G of the upper portion 106D and outer circumference 104C of the ring entering portion 104B are formed so as to have a smaller diameter toward the upper space, and the reduction ratio of the diameter of the inner circumference 106G of the upper portion 106D is smaller than the reduction ratio of the diameter of the outer circumference 104C of the ring entering portion 104B. Hence, the tapered shape of the second tapered seal 118 is realized. When the rotating body rotates, outward force in the radial direction is applied to the lubricant 92 in the second tapered seal 118 due to centrifugal force. Since the inner circumference 106G of the upper portion 106D is formed so as to reduce the diameter toward the upper space, such force acts so as to suction the lubricant 92.

In particular, the ring member 104 is formed in such a way that a maximum diameter D1 of the outer circumference 104C of the ring entering portion 104B is smaller than a minimum diameter D2 of the inner circumference 106G of the upper portion 106D. Accordingly, at the time of manufacturing, the ring member 104 can be further smoothly attached to the shaft 26 with the sleeve 106 being fitted to the shaft 26 with a play.

The second tapered seal 118 includes a second air-liquid interface 120 of the lubricant 92, and suppresses a leak-out of the lubricant 92 by a capillary phenomenon. The second air-liquid interface 120 of the lubricant 92 contacts both inner circumference 106G of the upper portion 106D and outer circumference 104C of the ring entering portion 104B.

When the eighth gap 138 is too wide, the volume of the lubricant 92 unnecessarily increases, and thus the volume fluctuation of the lubricant 92 due to a temperature change becomes large. Conversely, when the eighth gap 138 is too narrow, the viscosity resistance of the lubricant 92 in the eighth gap 138 increases, and the power consumption of the rotating device 100 increases due to a rotational resistance inherent to the former resistance. Hence, the width of the eighth gap 138 is designed so as to balance those factors. When, for example, the viscosity of the lubricant 92 is 8 to 12 cSt, it is preferable that the width of the eighth gap 138 should be set to 0.05 to 0.10 mm.

The first gap 126 includes two radial dynamic pressure generating portions 156 and 158 that produce dynamic pressures to the lubricant 92 in the radial direction when the sleeve 106 rotates relative to the shaft 26. The two radial dynamic pressure generating portions 156 and 158 are distant from each other in the axial direction, and the first radial dynamic pressure generating portion 156 is located above the second radial dynamic pressure generating portion 158 in the axial direction. In portions of the inner circumference 106A of the sleeve 106 corresponding to the respective two radial dynamic pressure generating portions 156 and 158, first and second radial dynamic pressure generating grooves 50 and 52 in a herringbone or spiral shape are formed. At least one of the first and second radial dynamic pressure generating grooves 50 and 52 may be formed in the outer circumference 26E of the middle portion of the shaft 26 instead of the inner circumference 106A of the sleeve 106.

The third gap 124 includes a first thrust dynamic pressure generating portion 160 that produces dynamic pressure to the lubricant 92 in the axial direction when the sleeve 106 rotates relative to the shaft 26. In a portion of the lower face 106C of the sleeve 106 corresponding to the first thrust dynamic pressure generating portion 160, a first thrust dynamic pressure generating groove 54 in a herringbone or spiral shape is formed. The first thrust dynamic pressure generating groove 54 may be formed in the upper face 110B of the housing bottom 110 instead of the lower face 106C of the sleeve 106.

The second gap 128 includes a second thrust dynamic pressure generating portion 162 that produces dynamic pressure to the lubricant 92 in the axial direction when the sleeve 106 rotates relative to the shaft 26. In a portion of the upper face 106B of the sleeve 106 corresponding to the second thrust dynamic pressure generating portion 162, a second thrust dynamic pressure generating groove 56 in a herringbone or spiral shape is formed. The second thrust dynamic pressure generating groove 56 may be formed in the lower face 104A of the ring member 104 instead of the upper face 106B of the sleeve 106.

When the rotating body rotates relative to the fixed body, the first and second radial dynamic pressure generating grooves 50 and 52, and the first and second thrust dynamic pressure generating grooves 54 and 56 respectively produce dynamic pressures to the lubricant 92. Those dynamic pressures support the rotating body in the radial and axial directions in a manner not contacting with the fixed body.

With respect to the positional relationship between the first radial dynamic pressure generating portion 156 and the second tapered seal 118, the first radial dynamic pressure generating portion 156 and the second tapered seal 118 at least partially overlap in the axial direction. That is, when a coordinate axis is defined in the axial direction, a coordinate range of the second tapered seal 118 and a coordinate range of the first radial dynamic pressure generating portion 156 have a common part.

With respect to the positional relationship between the sleeve recess 154 and the second thrust dynamic pressure generating portion 162, the second thrust dynamic pressure generating portion 162 is present inwardly of the sleeve recess 154 in the radial direction.

With respect to the surface processing of the sleeve 106, the sleeve 106 is formed of brass or SUS 430. For example, a work-piece of SUS 430 is cut and machined in a desired shape, and electrolytic nickel plating is performed on the processed work-piece to form a base layer. Next, electroless nickel plating is performed (in the case of brass, only electroless nickel plating is performed). Accordingly, the surface hardness of the sleeve 106 increases, and in particular, becomes harder than the surface hardness of the fixed body component (the ring member 104, the shaft 26, and the housing 102).

When the surface hardness of the rotating body component and the surface hardness of the fixed body component are substantially same, according to the experiences of the inventors of the present invention as persons ordinary skilled in the art, seizing is likely to occur due to the rotation of the rotating device. In particular, the thrust dynamic pressure generating portions 160 and 162 often rotate in a contacted manner with other members at the time of actuation/stopping of the rotating device, and thus such seizing is likely to occur. According to this embodiment, after the thrust dynamic pressure generating grooves 54 and 56 are formed in the sleeve 106, nickel plating is performed thereon, thereby providing a difference in the surface hardness. That is, the portion of the lower face 106C of the sleeve 106 corresponding to the first thrust dynamic pressure generating portion 160 and the portion of the upper face 110B of the housing bottom 110 corresponding to the first thrust dynamic pressure generating portion 160 have different hardness. Moreover, the portion of the upper face 106B of the sleeve 106 corresponding to the second thrust dynamic pressure generating portion 162 and the portion of the lower face 104A of the ring member 104 corresponding to the second thrust dynamic pressure generating portion 162 have different hardness. Accordingly, a possibility that a seizing occurs at the thrust dynamic pressure generating portions 160 and 162 can be reduced. Note that nickel plating may be performed on the fixed body component.

Formed in the sleeve 106 is a bypass communication hole 164 that bypasses the second thrust dynamic pressure generating portion 162, the first radial dynamic pressure generating portion 156, the second radial dynamic pressure generating portion 158, and the first thrust dynamic pressure generating portion 160. One end of the bypass communication hole 164 reaches the eighth gap 138, while another end thereof is present between the first thrust dynamic pressure generating portion 160 and the first tapered seal 114. The bypass communication hole 164 is a through-hole passing all the way through the sleeve 106 in the axial direction.

The cover ring 12 is formed of a metal material like SUS 430 or SUS 304 or brass, or, a resin material. The cover ring 12 is fastened to the hub 28 by bonding so as to cover the second air-liquid interface 120 present in the ninth gap 140. The hub 28, the sleeve 106, and the cover ring 12 form a vapor catching space 170. The vapor catching space 170 is in communication with the ninth gap 140. The vapor catching space 170 is located outwardly of the ninth gap 140 in the radial direction. When the sleeve 106 rotates, at least a part of vapors of the lubricant 92 vaporized from the second air-liquid interface 120 is caught by the vapor catching space 170 by centrifugal force. Hence, the amount of vaporized lubricant 92 discharged to the clean space 24 can be reduced.

When the clearance between the cover ring 12 and the fixed body is large, the amount of vapor lubricant 92 vaporized from the second air-liquid interface 120 and discharged to the clean space 24 increases. Conversely, when the clearance between the cover ring 12 and the fixed body is small, a possibility that the cover ring 12 contacts the fixed body increases. In accordance with the keen study by the inventors of the present invention, when the minimum clearance between the cover ring 12 and the fixed body in the axial direction is set to be within a range from 0.04 to 0.08 mm, the discharged amount of vaporized lubricant 92 can be suppressed to a level no problem in practice, and the possibility that the cover ring 12 contacts the fixed body becomes equal to or lower than a level no problem in practice. Moreover, when the minimum clearance between the cover ring 12 and the fixed body in the radial direction is set to be within a range from 0.02 to 0.06 mm, the discharged amount of vaporized lubricant 92 can be suppressed to a level no problem in practice, and the possibility that the cover ring 12 contacts the fixed body can be equal to or lower than a level no problem in practice.

An annular cover recess 172 concaved downwardly is formed in an upper face 104D of the ring member 104. The cover ring 12 includes a ring protrusion 12A that protrudes downwardly so as to correspond to the cover recess 172. For example, a part of the ring protrusion 12A enters the cover recess 172. The clearance between the cover ring 12 and the ring member 104 becomes minimum in a sixth gap 122 between the ring protrusion 12A and the cover recess 172.

In this case, a discharge resistance when the vapor lubricant 92 vaporized from the second air-liquid interface 120 is discharged to the clean space 24 can be increased, which suppresses the amount of vaporized lubricant 92. Moreover, since the discharge resistance in the sixth gap 122 between the ring protrusion 12A and the cover recess 172 is dominant, when the gap other than the sixth gap 122 is set to be wide, the discharge resistance itself remains substantially same. Hence, by setting the gap other than the sixth gap 122 to be wide, the processing and assembling can be facilitated, and thus the manufacturing efficiency can be improved.

A hub downward protrusion 281 which protrudes downwardly and which encircles the upper end of the base protrusion 4E is formed on a lower face 28B of the hub 28. Hence, the rigidity of the hub 28 can be enhanced, while at the same time, the clearance between the hub downward protrusion 281 and the base protrusion 4E can provide an additional labyrinth to the vapor lubricant 92 vaporized from the first air-liquid interface 116.

Figure 4:
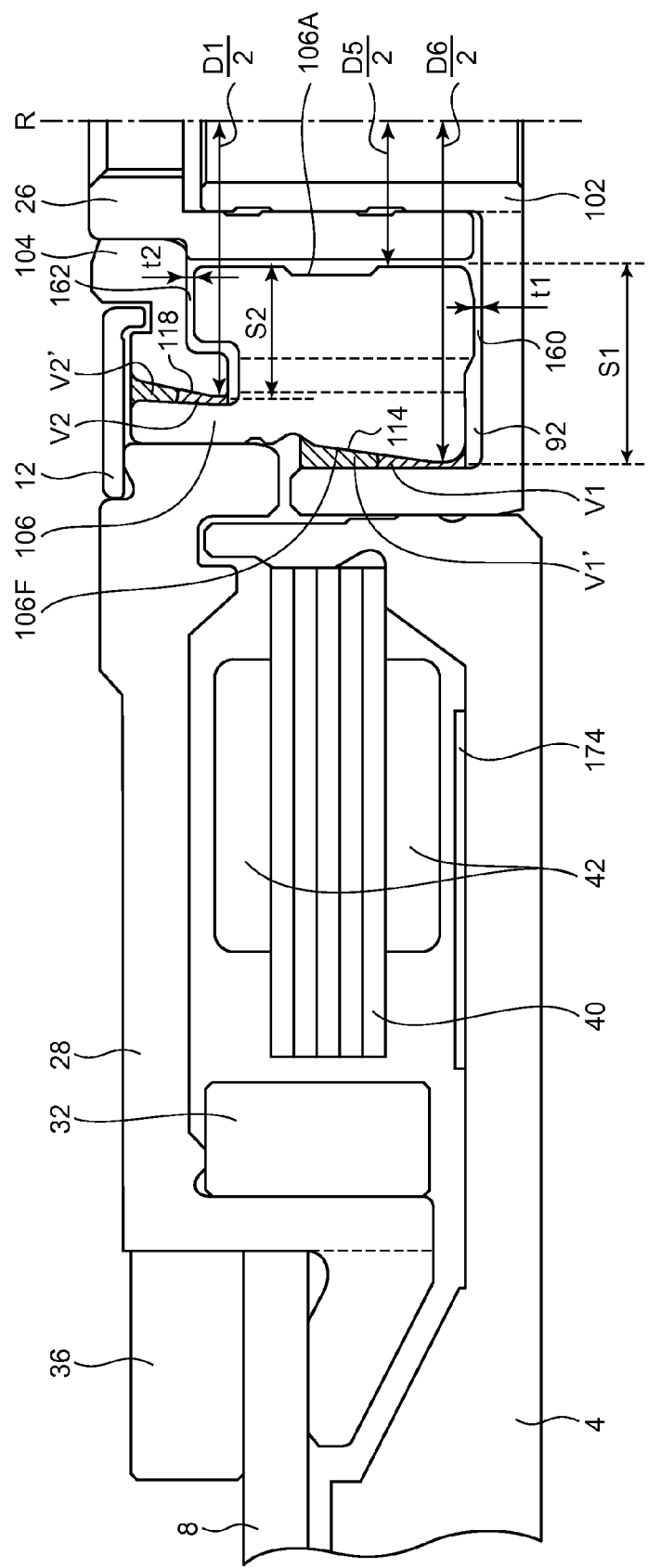
FIG. 4 is an explanatory diagram for explaining a relationship between an axial gap and a volume of a tapered seal.

FIG. 4 is an explanatory diagram for explaining a relationship between an axial gap and the volume of a tapered seal. FIG. 4 corresponds to FIG. 2. It is defined that the minimum diameter of the inner circumference 106A of the sleeve 106 is D5 and the maximum diameter of the lower outer circumference 106F of the sleeve 106 is D6. Moreover, it is defined that the area of the surface of the sleeve 106 facing with the ring member 104 in the axial direction is S2 and the area of the surface of the sleeve 106 facing with the housing 102 in the axial direction is S1. Furthermore, the volume of the portion of the first tapered seal 114 filled with the lubricant 92 is V1, and the volume of other portions is V1'. The volume of the portion of the second tapered seal 118 filled with the lubricant 92 is defined as V2, and the volume of other portions is defined as V2'. The size of the gap in the second thrust dynamic pressure generating portion 162 is defined as t2, and the size of the gap in the first thrust dynamic pressure generating portion 160 is defined as t1. In this case, an axial gap is t1+t2.

The following relational expressions can be satisfied with respect to S1 and S2.

$$S1=(D6^2-D5^2)\pi/4$$

$$S2=(D1^2-D5^2)\pi/4$$

The rotating device 100 is structured so as to satisfy at least one of following four relational expressions, desirably, all relational expressions.

$$S1 \times \text{axial gap} < V1$$

$$S1 \times \text{axial gap} < V1'$$

$$S2 \times \text{axial gap} < V2$$

$$S2 \times \text{axial gap} < V2'$$

For example, the first tapered seal 114 and the second tapered seal 118 may be formed so as to satisfy the above four relational expressions, or the amount of filled lubricant 92 may be adjusted so as to satisfy the four relational expressions.

Next, an explanation will be given of an operation of the rotating device 100 employing the above-explained structure. In order to rotate the magnetic recording disk 8, three-phase drive currents are supplied to the coils 42. When the drive currents flow through the coils 42, magnetic fluxes are produced along the nine salient poles. Those magnetic fluxes apply torque to the cylindrical magnet 32, and the rotating body and the magnetic recording disk 8 engaged therewith start rotating. At the same time, the voice coil motor 16 swings the swing arm 14 to let the recording/playing head to move within the swingable range over the magnetic recording disk 8. The recording/playing head converts magnetic data recorded in the magnetic recording disk 8 into electric signals and transmits the electric signals to a control board (unillustrated), or writes data transmitted from the control board as electric signals on the magnetic recording disk 8 as magnetic data.

According to the rotating device 100 of this embodiment, the second air-liquid interface 120 of the lubricant 92 is present in the ninth gap 140. Hence, the tapered seal and the radial dynamic pressure generating portion are permitted to overlap with each other in the axial direction. Accordingly, the distance between the first radial dynamic pressure generating portion 156 and the second radial dynamic pressure generating portion 158 in the axial direction, i.e., a bearing span can be elongated without being restricted by the length of the tapered seal so much, and thus the radial rigidity of the bearing unit can be enhanced.

Conversely, the length of the tapered seal can be elongated without being restricted by the bearing span so much to retain a sufficient amount of lubricant 92 and to suppress a splash thereof. Moreover, when the amount of lubricant 92 to be retained can be reduced, the ninth gap 140 and the fourth gap 132 can be narrowed by what corresponds to the reduction of the amount of lubricant 92. Accordingly, a leak-out of the lubricant 92 when, for example, a shock is applied to the rotating device 100 can be reduced by increased capillary force.

Since a splash of the lubricant 92 can be sufficiently suppressed in the tapered seal, when the respective lengths of the first radial dynamic pressure generating portion 156 and the second radial dynamic pressure generating portion 158 in the axial direction are elongated to increase radial dynamic pressure, a possibility of a splash of the lubricant 92 due to an imbalance in dynamic pressures to be generated can be maintained as low as possible. Hence, radial dynamic pressure can be further increased and thus the rigidity can be enhanced while suppressing a splash of the lubricant 92.

In general, improvement of the rigidity by enhancement of radial dynamic pressure brings about an increase in the power consumption due to a bearing loss, but the improvement of the rigidity by an increase of the bearing span generally does not result in such a loss.

In particular, when the thickness of the rotating device is set based on device standards, etc., or when the rotating device must be thin due to a requirement for thinning, according to the rotating device 100 of this embodiment, both bearing span and length of the tapered seal can be designed to be a length substantially independently from each other while maximally utilizing the standardized thickness of the rotating device 100.

According to this embodiment, the thickness of the rotating device 100 with the top cover 2 being attached thereto is 3 to 6 mm, in particular, substantially 5 mm.

Hence, a rotating device is provided which can maintain a low error rate while accomplishing both thinning and enhancement of the bearing rigidity, while at the same time, can maintain a sufficient amount of lubricant 92 when used for a relatively long time by a deep tapered seal.

According to the conventional rotating devices, a clamper and a screw for fastening such a clamper are present on the top face of the hub, and thus it is disadvantageous for thinning by what corresponds to the clamper and the screw. Hence, according to the rotating device 100 of this embodiment, the magnetic recording disk 8 is held between the clamper 36 engaged with the outer circumference 28D of the hub protrusion 28G and the mount portion 28H, thereby being fastened to the hub 28. Accordingly, in comparison with a conventional structure in which the clamper, etc., is fastened to the top face of the hub, the rotating device can be further made thin by what corresponds to the thickness of the clamper not disposed on the top face of the hub 28. Moreover, a distortion of the hub 28 itself can be suppressed.

When the shaft 26 and the supporting protrusion 108 are integrally formed together, the shape of the integrated work-piece becomes relatively complex, and it is difficult to precisely form such a work-piece. For example, it is difficult to allow a grinder to enter so as to grind the circumference of the shaft. Since the circumference of the shaft corresponds to the radial dynamic pressure generating portions, a relatively high dimensional precision is required. In contrast, according to the rotating device 100 of this embodiment, the shaft 26 and the supporting protrusion 108 are formed separately and then engaged with each other later. Hence, the circumference of the shaft 26 can be precisely formed while the shaft 26 is being fixed to the base 4.

Moreover, when the supporting protrusion 108 in the housing 102 is a separate piece, it becomes necessary to increase the joined portion between the supporting protrusion 108 and the housing bottom 110 in order to fasten those pieces with a sufficient fastening strength. This is disadvantageous for thinning of the rotating device 100. Hence, according to the rotating device 100 of this embodiment, the supporting protrusion 108 is formed integrally with the housing bottom 110.

According to the conventional rotating devices, the sleeve is often composed by three pieces: an inner member; an outer member; and a top ring mounted on the outer member. A groove is provided in the outer circumference of the inner member, and the inner member is fitted with the outer member to form a communication hole. Hence, it is difficult to make the outer member thin. Moreover, in order to mount the top ring on the outer member, the outer member needs a width (diameter) to allow the mounting of the top ring.

Conversely, according to the rotating device 100 of this embodiment, the sleeve 106 is provided in a manner that the inner member, the outer member, and the top ring are integrated, and thus there is substantially no practical problem when the portion corresponding to the outer member is made thin. Moreover, the bypass communication hole 164 is formed in the sleeve 106 itself, and thus the diameter of the sleeve 106 can be reduced. As an example, the internal diameter of the sleeve 106 is substantially 3 mm, and the outer diameter thereof is substantially 6 to 7 mm. Accordingly, the outer diameter of the sleeve 106 can be reduced, and the internal diameter of the stacked core 40 can be reduced by what corresponds to the reduction of the outer diameter of the sleeve 106. As a result, the salient poles 40B can be elongated while maintaining the outer diameter of the stacked core 40, and the coil 42 can be made further flat with the number of turns of winding being remained the same. Hence, the base 4 and the hub 28 can be thickened by what corresponds to the flattening of the coil 42.

The structure and operation of the rotating device of this embodiment were explained. This embodiment is merely an example, and a combination of the respective structural components permits various modifications, and such modifications are also within the scope of the present invention.

In the above-explained embodiment, the explanation was given of the example case in which the hub 28 and the sleeve 106 are separated pieces and joined together later, but the present invention is not limited to this case. For example, the hub 28 and the sleeve 106 may be integrally formed together in a seamless manner. In this case, the hub 28 and the sleeve 106 can be formed of the same material, e.g., a ferrous material like SUS 430 cut and machined or pressed. A surface processing, such as plating or resin coating, may be applied to the integrated hub 28 and sleeve 106. Example surface processing are a electroless nickel plating technique, and a technique of applying electrolytic nickel plating on a base layer, and of applying electroless nickel plating thereon. Such surface processing can suppress a peeling of minute process residues sticking to the processed surface.

According to the above-explained embodiment, the explanation was given of the example case in which the base 4 is formed by aluminum die-casting, but the present invention is not limited to this case. For example, the base 4 may be formed by pressing a metal sheet, such as an aluminum sheet or a steel sheet. In this case, an embossed structure in which a pushed-up convexity is formed on one-side surface of the base 4, while a concavity corresponding to the convexity is formed in another-side surface may be employed. The embossed portion provided at a predetermined location suppresses a deformation of the base 4. In this case, surface processing, such as a plating or resin coating, may be applied to the base 4. For example, a steel sheet is shaped by pressing, and skin layers of a nickel plating layer and a epoxy resin layer may be formed thereon.

The base 4 may be a combination of a sheet piece formed of a pressed metal sheet, such as an aluminum sheet or a steel sheet, and a die-casted piece shaped and formed by aluminum die-casting. For example, the bottom 4A may include such a sheet piece, while the outer circumferential wall 4B may include such a die-casted piece. According to such a structure, the reduction of the rigidity of the screw hole 22 can be suppressed. An example technique of manufacturing such a base 4 is to form the die-casted piece by aluminum die-casting while the sheet piece having already undergone a shaping is assembled in a mold for aluminum die-casting. According to such a manufacturing technique, a labor work for joining the sheet piece and the die-casted piece can be eliminated, and the dimensional precision of the die-casted piece relative to the sheet piece can be improved. Alternatively, an additional member for joining the sheet piece and the die-casted piece can be reduced or eliminated at all. This facilitates the thinning of the base 4.

According to the above-explained embodiment, the explanation was given of the example case in which the cover ring 12 employs a structure in which an elongated portion in the radial direction and an elongated portion in the axial direction are combined together, but the present invention is not limited to this case. For example, the cover ring 12 may employ a structure having no elongated portion in the axial direction. In this case, an increase in the number of manufacturing processes can be suppressed.

In the above-explained embodiment, the explanation was given of a so-called outer rotor rotating device having the cylindrical magnet 32 located outwardly with respect to the stacked core 40, but the present invention is not limited to this case. For example, the present invention is applicable to a so-called inner rotor rotating device having the cylindrical magnet located inwardly with respect to the stacked core.

According to the above-explained embodiment, the explanation was given of the example case in which the housing 102 is directly attached to the base 4, but the present invention is not limited to this case. For example, a brush-less motor including a rotating body and a fixed body may be separately prepared, and such a brush-less motor may be attached to a chassis.

In the above-explained embodiment, the explanation was given of the example case in which the stacked core is used, but other cores than the stacked core may be used.

What is claimed is:

1. A rotating device comprising:
a first encircling member which encircles a shaft and which is rotatable relative to the shaft;
a shaft supporting member which supports the shaft and which forms an annular first recess where one end of the first encircling member enters together with the shaft;
a second encircling member which is provided at another-end side of the first encircling member and which is fixed to the shaft in a manner encircling the shaft; and
a lubricant present in respective gaps between the first encircling member and the shaft, the first encircling member and the shaft supporting member, and, the first encircling member and the second encircling member, wherein:
the gap between the first encircling member and the shaft includes a radial dynamic pressure generating portion that produces dynamic pressure in the lubricant in a radial direction when the first encircling member rotates relative to the shaft;
an annular second recess concaved in an axial direction is formed in an another-end face of the first encircling member;
the second encircling member comprises an entering portion that enters the second recess in a non-contact manner; and
an outward gap in the radial direction between two gaps where the entering portion and the second recess face with each other in the radial direction includes an air-liquid interface of the lubricant.

2. The rotating device according to claim 1, wherein the outward gap in the radial direction between the two gaps where the entering portion and the second recess face with each other in the radial direction is formed so as to become widespread as becoming distant from the one end of the first encircling member.

3. The rotating device according to claim 1, wherein the second encircling member is formed so as to have a maximum diameter that is smaller than a minimum diameter of a surface of the first encircling member forming the outward gap in the radial direction between the two gaps where the entering portion and the second recess face with each other in the radial direction.

4. The rotating device according to claim 1, wherein the first encircling member is provided with, separately from the gap between the first encircling member and the shaft, a communication hole that causes the gap between the entering portion and the second recess to be in communication with a portion of the radial dynamic pressure generating portion at the one-end side of the first encircling member.

5. The rotating device according to claim 4, wherein the communication hole passes all a way through the first encircling member in the axial direction.

6. The rotating device according to claim 1, wherein:
a gap between the one end of the first encircling member and the shaft supporting member includes a thrust dynamic pressure generating portion that generates dynamic pressure in the lubricant in the axial direction when the first encircling member rotates relative to the shaft; and
a surface hardness of the first encircling member and a surface hardness of the shaft supporting member both in the thrust dynamic pressure generating portion differ from each other.

7. The rotating device according to claim 6, wherein:
a gap between the another end of the first encircling member and the second encircling member includes another thrust dynamic pressure generating portion that generates dynamic pressure in the lubricant in the axial direction when the first encircling member rotates relative to the shaft; and
a surface hardness of the first encircling member and a surface hardness of the second encircling member both in the another thrust dynamic pressure generating portion differ from each other.

8. The rotating device according to claim 1, wherein:
a supporting hole is formed in the shaft along the axial direction; and
the shaft supporting member comprises a supporting protrusion which is inserted in the supporting hole and which is fixed thereto.

9. The rotating device according to claim 8, wherein the supporting protrusion is fixed to the supporting hole by a combination of press-fitting and bonding.

10. The rotating device according to claim 8, wherein a linear expansion coefficient of the supporting protrusion is substantially same as a linear expansion coefficient of the shaft.

11. The rotating device according to claim 1, further comprising a hub which is fixed to an outer circumference of the first encircling member and on which a recording disk is to be mounted, wherein:
the hub comprises:
a hub protrusion to be engaged with a center hole of the recording disk; and
a mount portion provided outwardly in the radial direction with respect to the hub protrusion; and
the recording disk is fastened to the hub by being held between a clamper engaged with an outer circumference of the hub protrusion and the mount portion.

12. The rotating device according to claim 11, wherein:
a male screw thread is formed on the outer circumference of the hub protrusion; and
a corresponding female screw thread is formed on the clamper.

13. The rotating device according to claim 1, further comprising:
a core comprising an annular portion, and a plurality of salient poles protruding in the radial direction from the annular portion; and
coils wound around the plurality of salient poles, respectively, wherein:
the core and the coils are formed in such a way that a ratio of a height of the coil relative to a difference between a maximum outer diameter of the core and a minimum internal diameter of the core is within a range from 0.2 to 0.3.

14. The rotating device according to claim 1, further comprising a cover ring which is rotatable together with the first encircling member and which covers the air-liquid interface of the lubricant present in the outward gap in the radial direction between the two gaps where the entering portion and the second recess face with each other in the radial direction, wherein:
an annular third recess is formed in a surface of the second encircling member opposite to the entering portion among surfaces of the second encircling member;
the cover ring comprises a ring protrusion that enters the third recess in a non-contact manner; and
a gap between the cover ring and the second encircling member becomes minimum in a gap between the ring protrusion and the third recess.

15. The rotating device according to claim 1, further comprising:
a hub which is fixed to an outer circumference of the first encircling member and on which a recording disk is to be mounted; and
a cover ring which is rotatable together with the hub and which covers the air-liquid interface of the lubricant present in the outward gap in the radial direction between the two gaps where the entering portion and the second recess face with each other in the radial direction,
wherein the hub, the first encircling member and the cover ring form a vapor catching space which is in communication with the outward gap in the radial direction between the two gaps where the entering portion and the second recess face with each other in the radial direction and which catches a vapor of the lubricant at a time of a rotation operation of the rotating device.

16. A rotating device comprising:
a first encircling member which encircles a shaft and which is rotatable relative to the shaft;
a shaft supporting member which supports the shaft and which forms an annular first recess where one end of the first encircling member enters together with the shaft;
a second encircling member which is provided at another-end side of the first encircling member and which is fixed to the shaft in a manner encircling the shaft; and
a lubricant present in respective gaps between the first encircling member and the shaft, the first encircling member and the shaft supporting member, and, the first encircling member and the second encircling member, wherein:
the gap between the first encircling member and the shaft includes a radial dynamic pressure generating portion that produces dynamic pressure in the lubricant in a radial direction when the first encircling member rotates relative to the shaft;
an annular second recess concaved in an axial direction is formed in an another-end face of the first encircling member;
the second encircling member comprises an entering portion that enters the second recess in a non-contact manner;
a supporting hole is formed in the shaft along the axial direction; and
the shaft supporting member comprises a supporting protrusion which is inserted in the supporting hole and which is fixed thereto.

17. The rotating device according to claim 16, wherein the supporting protrusion is fixed to the supporting hole by a combination of press-fitting and bonding.

18. The rotating device according to claim 16, further comprising a hub which is fixed to an outer circumference of the first encircling member and on which a recording disk is to be mounted, wherein:
the hub comprises:
a hub protrusion to be engaged with a center hole of the recording disk; and
a mount portion provided outwardly in the radial direction with respect to the hub protrusion; and
the recording disk is fastened to the hub by being held between a clamper engaged with an outer circumference of the hub protrusion and the mount portion.

19. A rotating device comprising:
a first encircling member which encircles a shaft and which is rotatable relative to the shaft;
a shaft supporting member which supports the shaft and which forms an annular first recess where one end of the first encircling member enters together with the shaft;
a second encircling member which is provided at another-end side of the first encircling member and which is fixed to the shaft in a manner encircling the shaft; and
a lubricant present in respective gaps between the first encircling member and the shaft, the first encircling member and the shaft supporting member, and, the first encircling member and the second encircling member, wherein:
the gap between the first encircling member and the shaft includes a radial dynamic pressure generating portion that produces dynamic pressure in the lubricant in a radial direction when the first encircling member rotates relative to the shaft;
an annular second recess concaved in an axial direction is formed in an another-end face of the first encircling member;
the second encircling member comprises an entering portion that enters the second recess in a non-contact manner;
the rotating device further comprises a hub which is fixed to an outer circumference of the first encircling member and on which a recording disk is to be mounted, wherein:

the hub comprises:
- a hub protrusion to be engaged with a center hole of the recording disk; and
- a mount portion provided outwardly in the radial direction with respect to the hub protrusion; and the recording disk is fastened to the hub by being held between a clamper engaged with an outer circumference of the hub protrusion and the mount portion.

20. The rotating device according to claim 19, wherein:
- a male screw thread is formed on the outer circumference of the hub protrusion; and
- a corresponding female screw thread is formed on the clamper.

* * * * *